United States Patent [19]

Beyer et al.

[11] 3,802,905
[45] Apr. 9, 1974

[54] PREVENTING MIGRATION OF PIGMENTS IN DYEING OR PRINTING FIBROUS MATERIALS

[75] Inventors: Karl-Heinz Beyer, Frankenthal; Klaus Wulz, Ludwigshafen; Heinz Bille, Limburgerhof; Rudolf Krueger, Frankenthal; Guenter Barts, Ludwigshafen, all of Germany

[73] Assignee: Badische Anilin- & Soda-Fabrik Aktiengesellschaft, Ludwigshafen/Rhine, Germany

[22] Filed: Oct. 2, 1972

[21] Appl. No.: 294,462

[30] Foreign Application Priority Data
Oct. 7, 1971  Germany............................ 2150057

[52] U.S. Cl............................ 117/38, 8/93, 8/173, 106/308 Q, 117/121, 117/139.5 CQ, 252/8.6, 260/615 B
[51] Int. Cl. ......................... D06p 1/60, D06p 1/82
[58] Field of Search............... 117/161 UE, 139.5A, 117/139.5 CQ, 38, 121; 260/615 B, 823; 8/93, 173; 106/308; 252/8.6

[56] References Cited
UNITED STATES PATENTS

| | | | |
|---|---|---|---|
| 3,390,010 | 6/1968 | Frerker | 117/161 |
| 3,266,931 | 8/1966 | Zimmermann | 117/38 X |
| 3,132,965 | 5/1964 | Schmidt | 117/38 |
| 3,057,891 | 10/1962 | DeGroote | 260/615 B X |
| 3,036,118 | 5/1962 | Jackson | 260/615 B X |
| 2,997,362 | 8/1961 | Baumann | 8/93 |
| 2,863,788 | 12/1958 | Vartanian | 117/38 X |
| 2,762,718 | 9/1956 | Kleiner | 117/38 X |

FOREIGN PATENTS OR APPLICATIONS
1,255,628  12/1967  Germany ............................. 117/38

OTHER PUBLICATIONS

"Der gegenwartige Stand des kombinierten Pigmentfarbens und Ausrustens" by R. Kruger, Melliand Textilberichte, May, 1970, p. 565–568.

*Primary Examiner*—Herbert B. Guynn
*Assistant Examiner*—Dennis L. Albrecht
*Attorney, Agent, or Firm*—Johnston, Keil, Thompson & Shurtleff

[57] ABSTRACT

Preventing migration in dyeing and printing fibrous material using a block copolymer of ethylene oxide and propylene oxide.

4 Claims, No Drawings

PREVENTING MIGRATION OF PIGMENTS IN DYEING OR PRINTING FIBROUS MATERIALS

The invention relates to a method of preventing migration in dyeing and printing textile material with pigment dyes. It relates particularly to an accompanying softening treatment.

Migration is a serious problem in pigment dyeing, particularly when an improvement in handle (softening) is aimed at during dyeing. This phenomenon can be observed to a greater or lesser extent with all dyes and all types of fibers. It is particularly serious however when using pigment dyes.

Dissolved, dispersed or emulsified particles migrate with the water to the surface of the material and accumulate there. Since drying is usually subject to certain fluctuations, particularly in commercial operation, dyeings which are not level are obtained.

The movement of the dye solution or dispersion during drying to the places in the fabric where the water evaporates first is dependent on many factors, for example on the swelling and sorption properties of the fiber, the state of subdivision of the dye and the affinity of the dye for the fiber.

The picture is further complicated by various additives to the dye liquor such as dispersing agents, wetting agents, thickeners, salt level, etc.

Migration ceases when the fabric has dried to the point where the coherence of the liquid phase is interrupted. In the case of cellulose fibers this point is reached at about 30 percent moisture content.

Limiting moisture values below which the dye no longer migrates can be determined for a given type of fabric and a given dye. Although the phenomenon of migration is extremely complex, it may be stated that the most important measures for preventing migration are: decreasing the liquor take-up (the mobile phase has to be decreased), increasing the viscosity of the padding liquor, agglomerating the pigment upon drying, using special pigment formulations which have low tendency to migrate and, not least, adding special antimigration agents which arrest the dye particles on the fiber.

Antimigration agents hitherto used particularly for pigment dyeing and printing include polyvinyl methyl ethers of a mean molecular weight of about 100,000, alginates, low molecular weight cellulose ethers, polyethylene glycols of mean molecular weights of from 8,000 to 10,000 and special polymers of polyvinylcaprolactam and the like as described in German Patent No. 1,255,628.

Migration-inhibiting agents which are to give useful results particularly in pigment dyeing and printing followed by intermediate drying should neither disturb the dye finish nor cause loss in brilliance. In addition, the agent should have adequate liquor stability, should not cause any hardening of the handle and should have good solubility at room temperature. Finally, small amounts should give good effects.

The turbidity point of these compounds is also of special importance and should lie within a range from about 35° to 55°C.

Migration-inhibiting agents for pigment dyeing and printing are known from the literature. It is common to all these products however that although they may exhibit one or other of the required properties, not all of the criteria can be satisfied equally satisfactorily.

A number of proposals for solving this problem have been published. Thus for example a special antimigration agent based on poly(methyl vinyl ether) is described in Melliand Textilberichte 5/51 (1970), pages 565 to 568. This polymer has a turbidity point of about 30°C. The literature reference discloses that during the critical drying phase the compound is precipitated, so that the pigment particles are stuck to the fibers and prevented from migrating.

The extent of migration is tested in a test known as the double-layer test which is also described in the said literature reference. The double-layer test which is a new method of investigating migration phenomena makes possible for example migration studies of goods of varying humidity or at varying drying temperatures.

The agents according to the said literature references, and also polyethylene glycols of molecular weights of more than 8,000 and products having similar action, for example alginates and cellulose ethers, are compounds having fairly high molecular weights which do not satisfy practical requirements. In some cases marked hardening of the handle has to be tolerated, in other cases the dye finish is affected or the dye itself is partially or completely destroyed.

Moreover insensitivity to temperature of the dye liquors and compatibility with certain dyes have been unsatisfactory in the case of the auxiliaries described above.

German Patent Nos. 1,261,822 and 1,255,628 disclose special antimigration agents based on polymerized vinylcaprolactams.

By reason of their high molecular weights these agents do not completely satisfy modern requirements because there are problems regarding their dye compatibility.

The lastmentioned literature references disclose the most advanced methods in this field, and it was to be expected that efforts would be made to develop special polymers and copolymers which would bring this problem to an optimum solution.

It is an object of the invention to provide an antimigration agent for pigment dyeing and printing which effectively combines the required properties, has adequate solubility in water and moreover is simple to manufacture. Another object (because afterwashing is dispensed with) is to achieve optimum antimigration effects without any hardening of the handle.

These objects are achieved by a block copolymer of ethylene oxide and propylene oxide.

The process for preventing migration in dyeing or printing fibrous materials with pigments is characterized in that there is added to the pigment liquor or paste a block copolymer of the formula:

in which
A is an ethylene oxide unit,
B is a 1,2-propylene oxide unit,
$n$ is one of the integers from 30 to 60, and
$m$ is one of the integers from 10 to 25.

A particular embodiment of the process consists in partly replacing the block copolymer by a $C_8$ to $C_{12}$ alkylphenol oxyethylate having a molecular weight of from 500 to 800 or by a polyethylene glycol having a molecular weight of from 300 to 500.

The compounds used according to the invention are, chemically speaking, block copolymers of ethylene oxide and propylene oxide, i.e. according to the above definition block copolymers of ethylene glycol of a molecular weight of from 1320 to 2640, preferably from 1600 to 2200, to which propylene oxide has been added on at both sides. The molecular weight of the end product is from 2480 to 5540, preferably from 2800 to 4500. The ratio of ethylene oxide to propylene oxide in the block copolymer may be from 69:31 to 31:69; the ratio of from 60:40 to 50:50 is particularly favorable.

Ethylene glycol, diethylene glycol and lower polyethylene glycols are suitable as starting substances for the production of the agents essential for the process of the invention. Ethylene oxide is added to these ethylene glycols in the molar amount necessary to set up the molecular weight of the polyethylene glycol according to the definition. When ethylene glycol is used, it is convenient to add amounts of from 30 to 60 moles per mole of starting substance. The polyethylene glycols obtained are then reacted with the propylene oxide required as second starting component. The amounts of propylene oxide should be such that at least 31 percent by weight and not more than 69 percent by weight, preferably from 40 to 60 percent by weight, based on the complete molecule (final molecular weight) is added on. The addition of from 42 to 52 percent by weight of propylene oxide is particularly interesting industrially.

Oxyalkylations of this type are conveniently carried out in the presence of an alkaline catalyst and are based on known measures such as are generally known by experts so that a detailed description of the process here is not necessary.

It is essential that the required molar ratio and ratio by weight of ethylene oxide to propylene oxide and also the molecular weights are maintained in the production of these products because other ratios or other molecular weights may cause the abovementioned disadvantages, namely inadequate antimigration effects or poor solubility. Molecular weights above the upper limit do not usually offer any advantage because in this case the solubility of the products falls off sharply, which may prevent their use as antimigration agents in pigments.

It has been found that within the molecular weight ranges according to the invention and particularly in the range between 5000 and 6000 the solubility may be influenced even more effectively by replacing part of the block copolymer essential according to the invention, preferably from 5 to 30 percent by weight, particularly from 10 to 20 percent by weight, by $C_8$ to $C_{12}$ alkylphenoloxyethylates, preferably nonylphenoloxyethylates of molecular weights of from 500 to 800 or by polyethylene glycols of molecular weights of from 300 to 500. There is then a synergistic effect as a result of which the favorable properties are further enhanced.

The resulting block copolymers or the said preferred mixtures are added to the dye liquors or print pastes. Such a dye liquor or print paste conveniently consists of a pigment, a binder (for example based on an acrylate such as is described for example in German Patent No. 1,261,822), a catalyst (as for example magnesium chloride or ammonium chloride), an amino resin which has been reacted with formaldehyde and if desired etherified (such as also described in the said literature reference) as a cross-linking agent, and the antimigration agent to be used according to the invention. The dye liquors advantageously also contain other auxiliaries such as wetting agents or antifoams or products which prevent deposition on rollers.

The dye liquors or print pastes may contain from about 0.3 to 5 percent by weight, preferably from 0.8 to 1.5 percent by weight, based on the weight of liquor, of the said block copolymers of ethylene oxide and propylene oxide or of the preferred mixtures of ethylene oxide and propylene oxide with polyethylene glycol or alkylphenoloxyethylates.

The antimigration agents to be used according to the invention not only effectively prevent migration of the pigments but also have a surprising effect on the handle of the fabric and on durability to laundering. Block copolymers of propylene oxide and ethylene oxide or mixtures thereof with polyethylene glycol or alkylphenoloxyethylates apparently function as handle improvers and softeners for textiles at the same time. No antimigration agents have hitherto been known which effect a similar improvement in laundering durability for pigment colorations and a similar improvement in the handle of fabrics; the invention thus represents a considerable technical advance in this field of textile treatment.

Reference should also be made to the surprisingly good solubility of the said auxiliaries. The turbidity points of the compounds or mixtures of compounds to be added according to the invention are all in the desired favorable range of from 35° to 55°C.

The Examples which follow illustrate the invention without limiting it.

The parts specified in the Examples are parts by weight.

EXAMPLE 1

A clean, dry autoclave having a stirrer, thermometer, gas inlet pipe and manometer is thoroughly flushed out with nitrogen, 3 parts of potassium hydroxide and 37 parts of a pure ethylene glycol are mixed therein and then 1163 parts of ethylene oxide gas is forced in while stirring at 140° to 150°C over five to siven hours at 5 to 8 atmospheres gauge. The mixture obtained is kept for another hour at 140° to 150°C, cooled to about 50°C and the molecular weight is determined by way of the hydroxyl number. A substance having a molecular weight of about 1800 is obtained.

504 parts of the polyethylene glycol obtained has 930 parts of propylene oxide added thereto, without further addition of catalyst, while stirring at 125° to 135°C over six to eight hours at 5 to 8 atmospheres. After a reaction period of three to four hours at 125° to 135°C the mixture is cooled to about 50°C and removed from the reactor. The catalyst is neutralized with glacial acetic acid and volatile constituents are removed by a short evacuation at 100°C. If necessary bleaching may be carried out at 110°C with a small amount of 50 percent hydrogen peroxide.

The product, which is a viscous block copolymer miscible with water to give a clear solution, contains about 54 percent by weight of ethylene oxide and 46 percent by weight of propylene oxide with a certain proportion of polypropylene glycol which cannot be determined exactly. The molecular weight, determined by way of the hydroxyl number, is 3350.

EXAMPLE 2

1440 parts of ethylene oxide is first added to 62 parts of ethylene glycol at 140° to 150°C by the method described in Example 1. 400 parts of the polyethylene glycol obtained, which according to hydroxyl number determination has a molecular weight of about 1510, then has 800 parts of propylene oxide added to it without further catalyst at 125° to 135°C and 5 to 8 atmospheres over five to seven hours. The clear viscous liquid polyglycol has a molecular weight of about 2500 determined by way of the hydroxyl number. The ratio by weight of ethylene oxide to propylene oxide of the sample (which mixes well with water) is 60:40. 40.

EXAMPLE 3

In accordance with the method of Example 1, 43 parts of ethylene glycol to which 5 parts of potassium oxide has been added is first gassed at 140° to 150°C with 1280 parts of ethylene oxide. The molecular weight of this polyethylene glycol (determined by way of the hydroxyl number) is 1910. 988 parts of propylene oxide is then added on to 423 parts of this compound without further addition of catalyst within six to eight hours at 130° to 135°C and 5 to 8 atmospheres in a reactor while stirring.

A viscous clear water-miscible polymer is obtained having a molecular weight of 3600 and a definite polypropylene oxide content. The ratio by weight of ethylene oxide to propylene oxide is 54:46.

EXAMPLE 4

In accordance with the method of Example 1 a polyethylene glycol of molecular weight about 1600 is prepared from 62 parts of ethylene glycol and 1540 parts of ethylene oxide which is pumped in at 140° to 150°C and 6 to 8 atmospheres. Propylene oxide is then added on in a second stage at 130° to 135°C. 500 parts of the polyethylene glycol is used and 980 parts of propylene oxide is added to it.

A viscous clear product is obtained having a molecular weight of about 4000. The ratio by weight of ethylene oxide to propylene oxide is 40:60. By mixing this product with 20 percent by weight of oxyethylated nonylphenol having a molecular weight of about 600 or a polyethylene glycol of a molecular weight of about 400, a polyadduct which is clearly soluble in water is obtained for a dye liquor.

EXAMPLE 5 — (application)

The products or mixtures prepared in the preceding Examples are subjected, after the dye liquors have been padded by means of a padding machine onto different types of fabric, to a number of tests in which for example the antimigration effect, running properties, laundering durability, liquor stability, turbidity point, solubility and influence on handle are tested. Such a dye liquor may consist for example advantageously of 100 parts of an acrylate copolymer as pigment binder according to German Patent No. 1,255,628 (Example 1 of the said literature reference), 100 parts of a methylolated amino resin former based on glyoxalmonoureine as crosslinker, 12 parts of a pigment dye Pigment Blue C.I. 74,160, 6 parts of a mixture of an oxyethylated castor oil with the esterification product of a polyethylene/polypropylene glycol with a saturated long chain fatty acid as an antifoam, 12 parts of magnesium chloride hexahydrate, 10 parts of the products according to the invention as antimigration agents and finally 760 parts of water.

In the antimigration test all the products do well both in the Benz dryer (in which the fabric, after the dye liquor has been padded on, is dried as a continuous strip at 100°C) and in the double-layer test. The double-layer test is particularly severe because here the padded fabric is doubled while still wet and then dried. Each layer of fabric can only dry toward the outer side. The inner side of the fabric is more or less pale and the outer side darker depending on the extent of the migration.

The novel products according to the invention have proved to be far superior to prior art antimigration agents in these tests.

In the test of running properties (exposure to shear forces) in which the occurrence of deposits on the driving roller and printing roller and also in the dye liquor are investigated, the compounds which are used in accordance with the invention are always better than the prior art compounds. No troublesome deposits occur on the rollers even after long periods.

Moreover the polyalkylene glycols to be used according to the invention stabilize the dye liquors. After several hours no sedimentation and no dye agglomeration (tested by outflow onto filter paper) can be observed.

We claim:

1. A process for dyeing or printing fibrous materials with pigment dyes which comprise (1) contacting said material with a dye liquor or paste containing:
   a. a pigment dye and
   b. 0.3 to 5% by weight based on the weight of said liquor or paste of a block copolymer of the formula:

$$B_m - A_n - B_m$$

in which
   A is an ethylene oxide unit;
   B is a 1,2-propylene oxide unit;
   $n$ is one of the integers from 30 to 60; and
   $m$ is one of the integers from 10 to 25, and
(2) drying said material; wherein said copolymer functions to prevent migration of the pigment dye.

2. A process as claimed in claim 1 wherein 5 to 30% by weight of the block copolymer is replaced by a $C_8$ to $C_{12}$ alkylphenoloxyethylate having a molecular weight of from 500 to 800 or by a polyethylene glycol having a molecular weight of from 300 to 500.

3. A process according to claim 2 wherein the block copolymer has from 10 to 20 percent by weight thereof replaced by an alkylphenoloxyethylate or polyethylene glycol.

4. A process as claimed in claim 1 wherein the copolymer is added to the dye liquor or paste in an amount of from 0.8 to 1.5 percent by weight based on the weight of liquor or paste.

* * * * *